United States Patent
Bentz et al.

(10) Patent No.: US 9,298,600 B2
(45) Date of Patent: Mar. 29, 2016

(54) METHOD AND APPARATUS FOR DYNAMICALLY ALLOCATING MEMORY ADDRESS SPACE BETWEEN PHYSICAL MEMORIES

(71) Applicant: Avnera Corporation, Beaverton, OR (US)

(72) Inventors: Ole Bentz, Hillsboro, OR (US); Robert Mays, Portland, OR (US); Bruce Nepple, Portland, OR (US); James Anderson, Portland, OR (US)

(73) Assignee: Avnera Corporation, Beaverton, OR (US)

( * ) Notice: Subject to any disclaimer, the term of this patent is extended or adjusted under 35 U.S.C. 154(b) by 115 days.

(21) Appl. No.: 13/738,709

(22) Filed: Jan. 10, 2013

(65) Prior Publication Data

US 2014/0195716 A1   Jul. 10, 2014

(51) Int. Cl.
*G06F 12/00* (2006.01)
*G06F 12/02* (2006.01)
*G06F 12/06* (2006.01)

(52) U.S. Cl.
CPC ........ *G06F 12/0223* (2013.01); *G06F 12/0638* (2013.01); *G06F 2212/1012* (2013.01); *G06F 2212/205* (2013.01)

(58) Field of Classification Search
CPC ..... G06F 12/00; G06F 3/0629; G06F 3/0631; G06F 12/0646
USPC .................................. 711/100, 102, 154, 170
See application file for complete search history.

(56) References Cited

U.S. PATENT DOCUMENTS

| | | | |
|---|---|---|---|
| 5,956,751 A | 9/1999 | Lai | |
| 6,023,281 A | 2/2000 | Grigor et al. | |
| 6,775,737 B1 * | 8/2004 | Warkhede et al. | 711/108 |
| 7,404,060 B2 * | 7/2008 | Hoshina | 711/170 |
| 7,617,691 B2 * | 11/2009 | Street et al. | 62/132 |
| 8,335,926 B2 * | 12/2012 | Clemmensen et al. | 713/186 |

* cited by examiner

*Primary Examiner* — Tuan Thai
(74) *Attorney, Agent, or Firm* — Marger Johnson

(57) ABSTRACT

A memory address space for each of a plurality of physical memories in a microprocessor-based system is allocated prior to knowing the desired logical size of at least one of the physical memories. At least two of the allocated memory address spaces overlap at least a portion of each other. After the system is fabricated, a pointer value set that corresponds to an address boundary between at least two physical memories of the fabricated system is set during boot time and/or during run time when the size of the physical memories are known. The technique provides a faster time-to-market for microprocessor-based systems by allowing, for example, Application Specific Integrated Circuits (ASICs) comprising microprocessor systems on-chip be manufactured prior to the final firmware and software being fully developed. Additionally, the subject matter disclosed herein permits changes in memory-space allocation for finalized ASIC designs.

20 Claims, 8 Drawing Sheets

METHOD AND APPARATUS FOR DYNAMICALLY ALLOCATING MEMORY ADDRESS SPACE BETWEEN PHYSICAL MEMORIES

BACKGROUND

The subject matter disclosed herein relates to processing-based systems and techniques. In particular, the subject matter disclosed herein relates to allocating memory space in microprocessor-based systems prior to firmware for the system being finalized, thereby shortening the realization time for the microprocessor-based system.

In microprocessor architectures in which logical memory address space is smaller than the amount of physical memory that can be incorporated into the architecture, partitioning of the address space among physical memories (such as Read Only Memory (ROM), Random Access Memory (RAM), and peripheral bus registers) has been traditionally done statically. Accordingly, the static nature of the address space allocation adversely lengthens the realization time for microprocessor-based systems.

BRIEF DESCRIPTION OF THE DRAWINGS

The subject matter disclosed herein is illustrated by way of example and not by limitation in the accompanying figures in which like reference numerals indicate similar elements and in which.

DETAILED DESCRIPTION

Figure 1A:
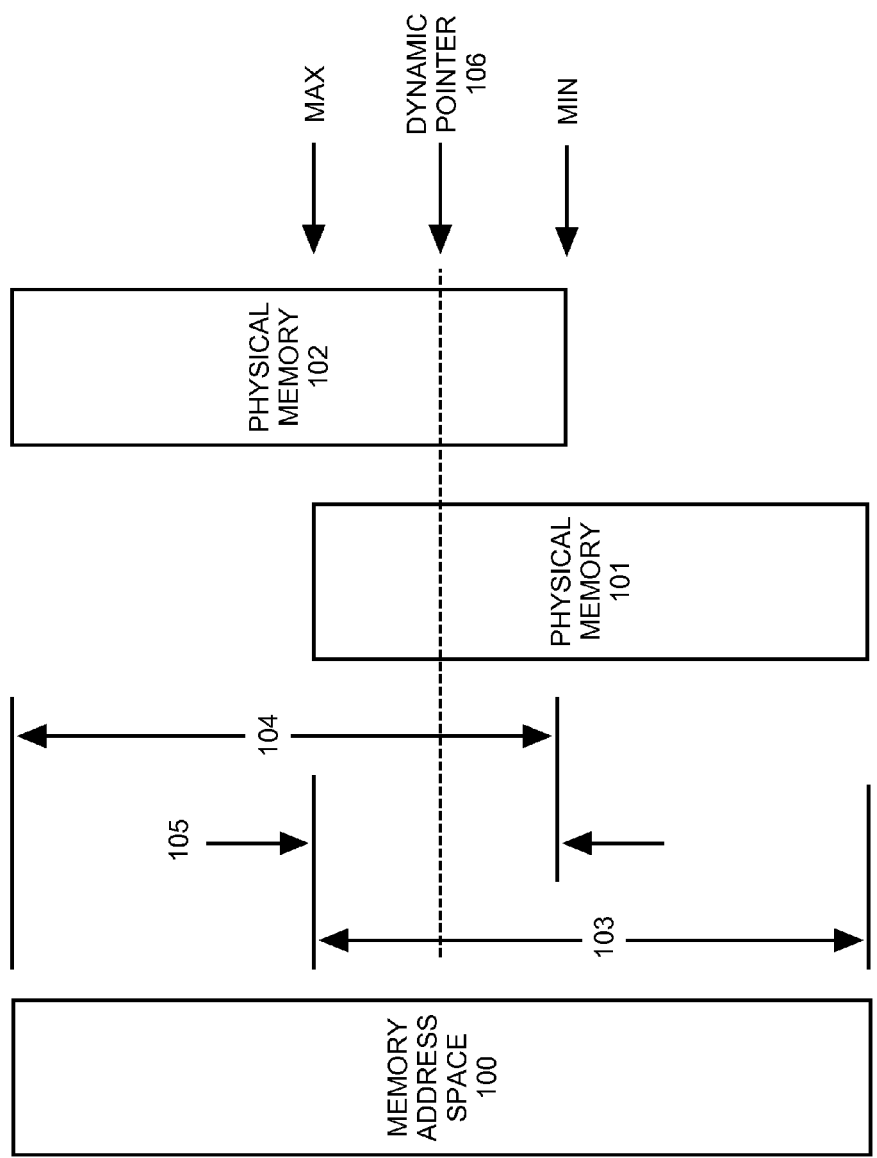
FIG. 1A depicts a first exemplary embodiment of a dynamic allocation of a memory address space according to the subject matter disclosed herein.

The subject matter disclosed herein relates in allocating memory space in microprocessor-based systems prior to firmware for the system being finalized, thereby shortening the realization time for the microprocessor-based system. Thus, the subject matter disclosed herein provides a faster time-to-market for microprocessor-based systems by allowing, for example, Application Specific Integrated Circuits (ASICs) comprising on-chip microprocessor systems to be manufactured prior to the final firmware and software for the system. Additionally, the subject matter disclosed herein permits changes in memory-space allocation for finalized ASIC designs, thereby allowing finalized ASIC design greater flexibility and greater system-life lengths.

As used herein, the word "exemplary" means "serving as an example, instance, or illustration." Any embodiment described herein as "exemplary" is not to be construed as necessarily preferred or advantageous over other embodiments. Additionally, it will be appreciated that for simplicity and/or clarity of illustration, elements illustrated in the figures have not necessarily been drawn to scale. For example, the dimensions of some of the elements may be exaggerated relative to other elements for illustrative clarity. Further, in some figures only one or two of a plurality of similar elements indicated by reference characters for illustrative clarity of the figure, whereas all of the similar element may not be indicated by reference characters. Further still, it should be understood that although some portions of components and/or elements of the subject matter disclosed herein have been omitted from the figures for illustrative clarity, good engineering, construction and assembly practices are intended.

Figure 1B:
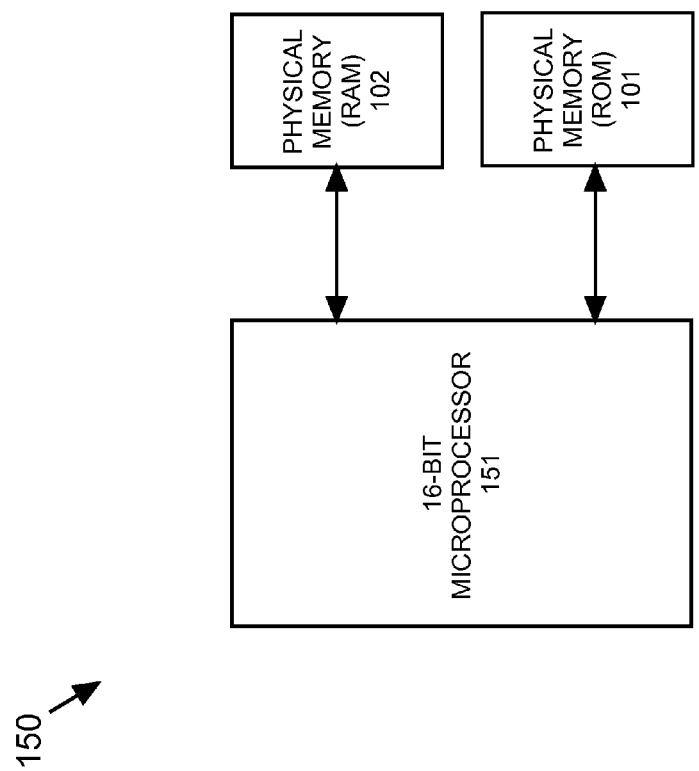
FIG. 1B depicts a functional block diagram of an exemplary embodiment of an apparatus utilizing the first exemplary embodiment of dynamic allocation of a memory space according to the subject matter disclosed herein.

FIG. 1A depicts a first exemplary embodiment of a dynamic allocation of a memory address space 100 according to the subject matter disclosed herein. FIG. 1B depicts a functional block diagram of an exemplary embodiment of an apparatus 150 utilizing the first exemplary embodiment of dynamic allocation of a memory space according to the subject matter disclosed herein. In one exemplary embodiment, apparatus 150 may represent a portion of a microprocessor-based ASIC. Memory address space 100 represents an address space for a 16-bit microprocessor 151 and includes address ranges allocated for a first physical memory 101 and a second physical memory 102. In particular, an address range 103 has been allocated for first physical memory 101 and an address range 104 has been allocated for second physical memory 102. In one exemplary embodiment, first physical memory 101 comprises a Read Only Memory (ROM) and the second physical memory 102 comprises a Random Access Memory (RAM). In an alternative exemplary embodiment, the first physical memory 101 comprises a Random Access Memory (RAM) and the second physical memory 102 comprises a Read Only Memory (ROM). It should also be understood that apparatus 150 may include other addressable devices within memory address space 100 that are not shown. Additionally, it should be understood that memory address space 100 could represent an address space for a microprocessor other than a 16-bit microprocessor.

Initially, one or both of the respective sizes of physical memories 101 and 102 may not be known because the design of the system is not sufficiently defined; consequently, the address boundary between physical memory 101 and physical memory 102 is also not known. According to the subject matter disclosed herein, an address-space overlap region 105 is selected that accounts for the maximum sizes for both physical memory 101 and physical memory 102. A dynamic pointer 106 is later set and can have a value that corresponds to any of the addresses in address-space overlap region 105. That is, after being set, dynamic pointer 106 can have a range of values that correspond to addresses between the minimum (MIN) and the maximum (MAX) addresses of address-space overlap region 105.

When the processor (not shown) boots and/or during run time, the processor sets the value for dynamic pointer 106 in a well-known manner by, for example, querying addresses in the address-space overlap region 105 to determine the actual boundary between physical memory 101 and physical memory 102. After dynamic pointer 106 is set, if the processor (not shown) accesses memory addresses below dynamic pointer 106, the first physical memory 101 (i.e., ROM) is accessed, and if the processor accesses addresses above dynamic pointer 106, the second physical memory 102 (i.e., RAM) is accessed.

Figure 2A:
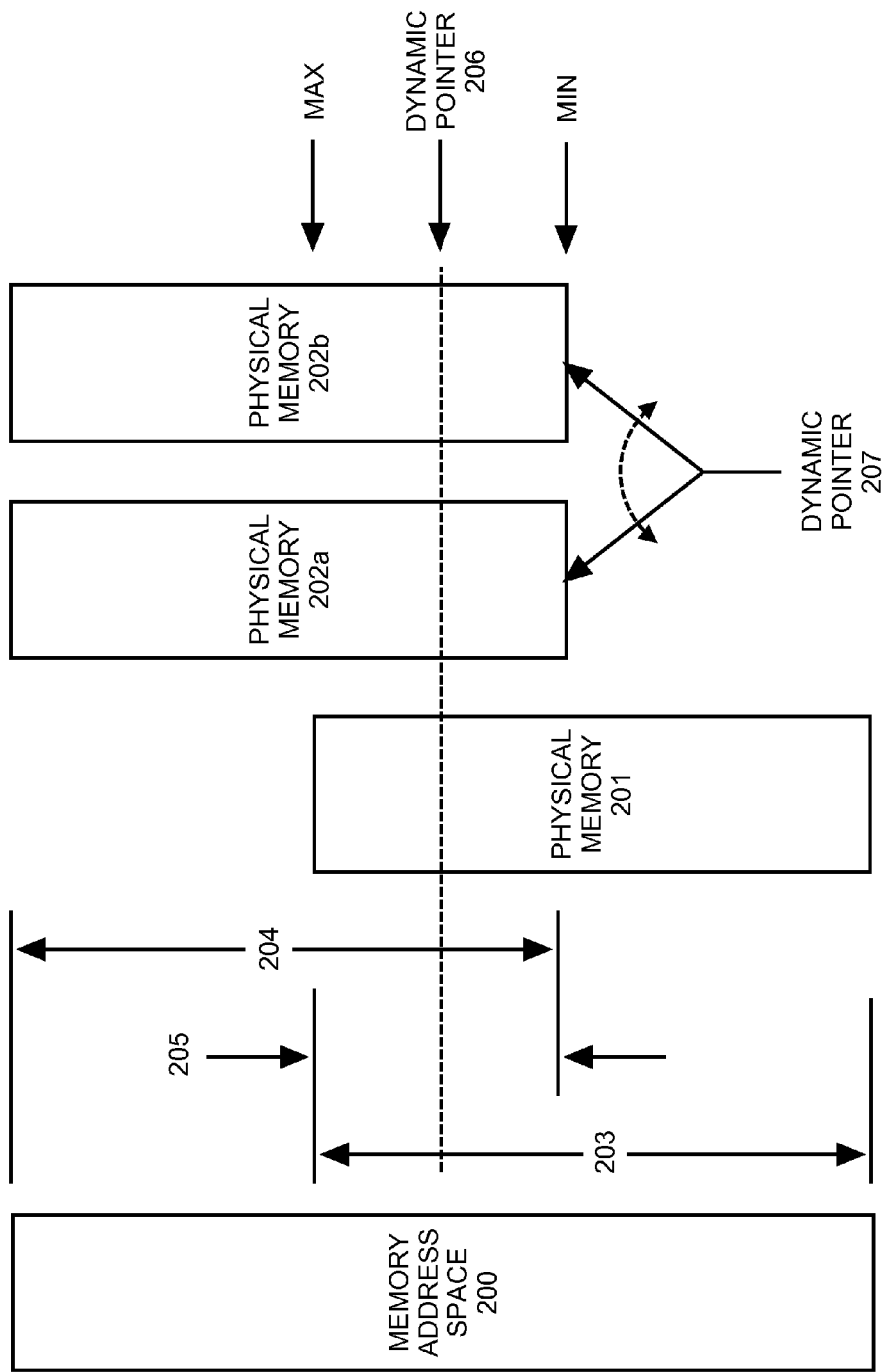
FIG. 2A depicts a second exemplary embodiment of a dynamic allocation of a memory address space according to the subject matter disclosed herein.
Figure 2B:
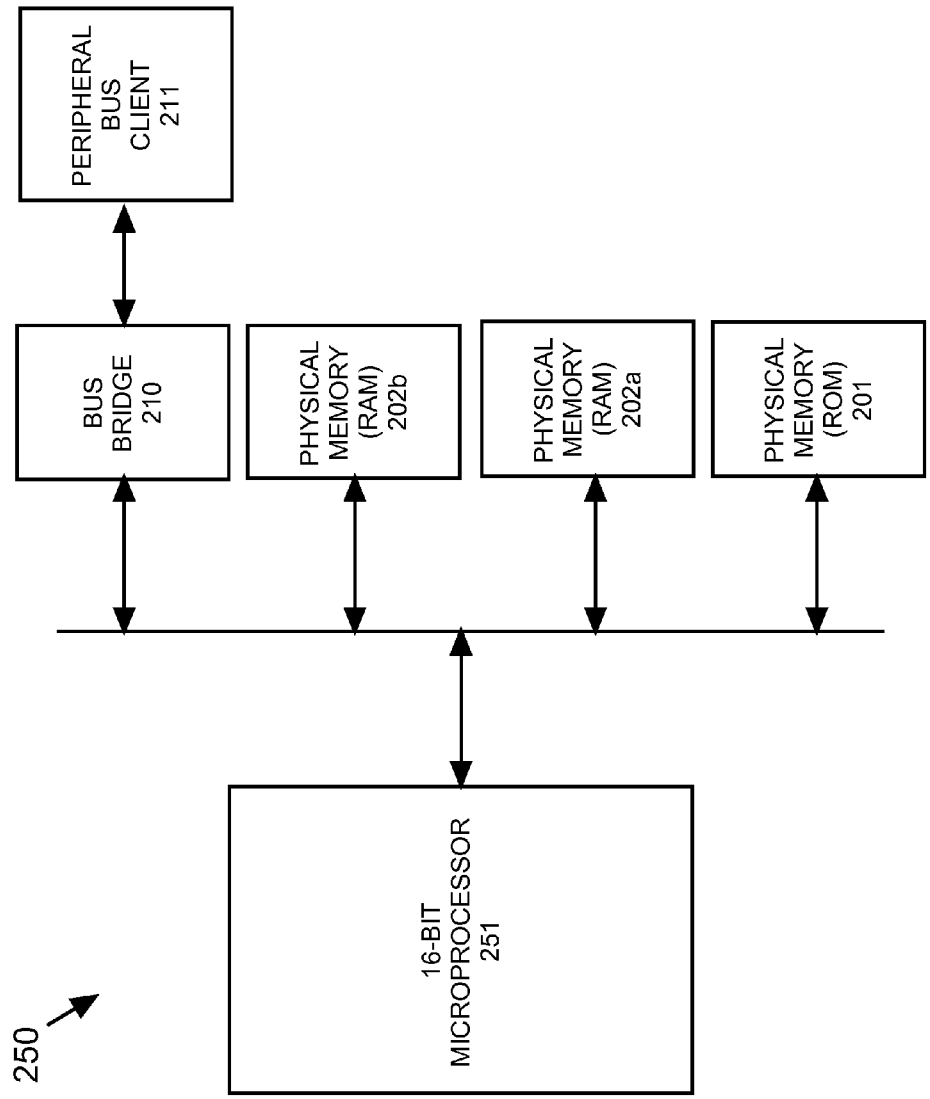
FIG. 2B depicts a functional block diagram of an exemplary embodiment of an apparatus utilizing the second exemplary embodiment of dynamic allocation of a memory space according to the subject matter disclosed herein.

FIG. 2A depicts a second exemplary embodiment of a dynamic allocation of a memory address space 200 according to the subject matter disclosed herein. FIG. 2B depicts a functional block diagram of an exemplary embodiment of an apparatus 250 utilizing the second exemplary embodiment of dynamic allocation of a memory space according to the subject matter disclosed herein. In one exemplary embodiment, apparatus 250 may represent a portion of a microprocessor-based ASIC. Memory address space 200 represents an address space for a 16-bit microprocessor 251 and includes address ranges for a first physical memory 201, a second physical memory 202, and a third physical memory 203. In particular, an address range 203 corresponds to first physical memory 201 and an address range 204 corresponds to second physical memory 202a and to third physical memory 202b. In one exemplary embodiment, first physical memory 201 comprises a Read Only Memory (ROM) and second physical memories 202a and 202b comprise a Random Access Memory (RAM). In alternative exemplary embodiments, physical memories 201, 202a and 202b could be any combination of ROM and RAM memories. Apparatus 250 can be coupled to one or more bus bridges 210 that are coupled to one or more peripheral bus clients 211, and include address ranges for each bus bridge, which can overlap according to the subject matter disclosed herein. It should also be understood that apparatus 250 may include other addressable devices within memory address space 200 that are not shown. Additionally, it should be understood that memory address space 200 could represent an address space for a microprocessor other than a 16-bit microprocessor.

Similar to the exemplary embodiments of FIGS. 1A and 1B, one or more of the respective sizes of physical memories 201, 202a and 202b may not be known because the design of the system is not sufficiently defined; consequently, the address boundary between physical memory 201 and physical memories 202a and 202b is also not known. According to the subject matter disclosed herein, an address-space overlap region 205 is selected that accounts for the maximum sizes for both physical memory 201 and physical memories 202a and 202b. A dynamic pointer 206 is later set and can have a value that corresponds to any of the addresses in address-space overlap region 205. That is, after being set, dynamic pointer 206 can have a range of values that correspond to addresses between the minimum (MIN) and the maximum (MAX) addresses of address-space overlap region 205.

When the processor (not shown) boots and/or during run time, the processor sets the value for dynamic pointer 206 in a well-known manner by, for example, querying addresses in the address-space overlap region 205 to determine the actual boundary between physical memory 201 and physical memories 202a and 202b. After dynamic pointer 206 is set, if the processor (not shown) accesses memory addresses below dynamic pointer 206, the first physical memory 101 (i.e., ROM) is accessed, and if the processor accesses addresses above dynamic pointer 106, the second physical memories 202a and 202b (i.e., RAM) are accessed. As also depicted in FIG. 2, a second dynamic pointer 207 is used for selecting which physical memory 202a or 202b are active. The second dynamic pointer 207 can be set at boot time and/or run time, e.g., to select which RAM is being used while the microprocessor is running in, for example, an interrupt level 0 as opposed to an interrupt level 1.

It should be understood that the exemplary embodiments of the subject matter disclosed herein depicted in FIGS. 1A, 1B, 2A and 2B can be extended to various overlaps, including a complete overlap, as well as any number of physical memories that are arranged in parallel and that are selected by the second dynamic pointer. Additionally, it should be understood that initial memory space allocations according to the subject matter disclosed herein can include peripheral bus registers as part of the overall address space, and that one or more additional points can be used for selecting one or more of the peripheral bus registers to be active. Further still, additional pointers can be used for selecting between individual memories within groups of memories.

Figure 3:
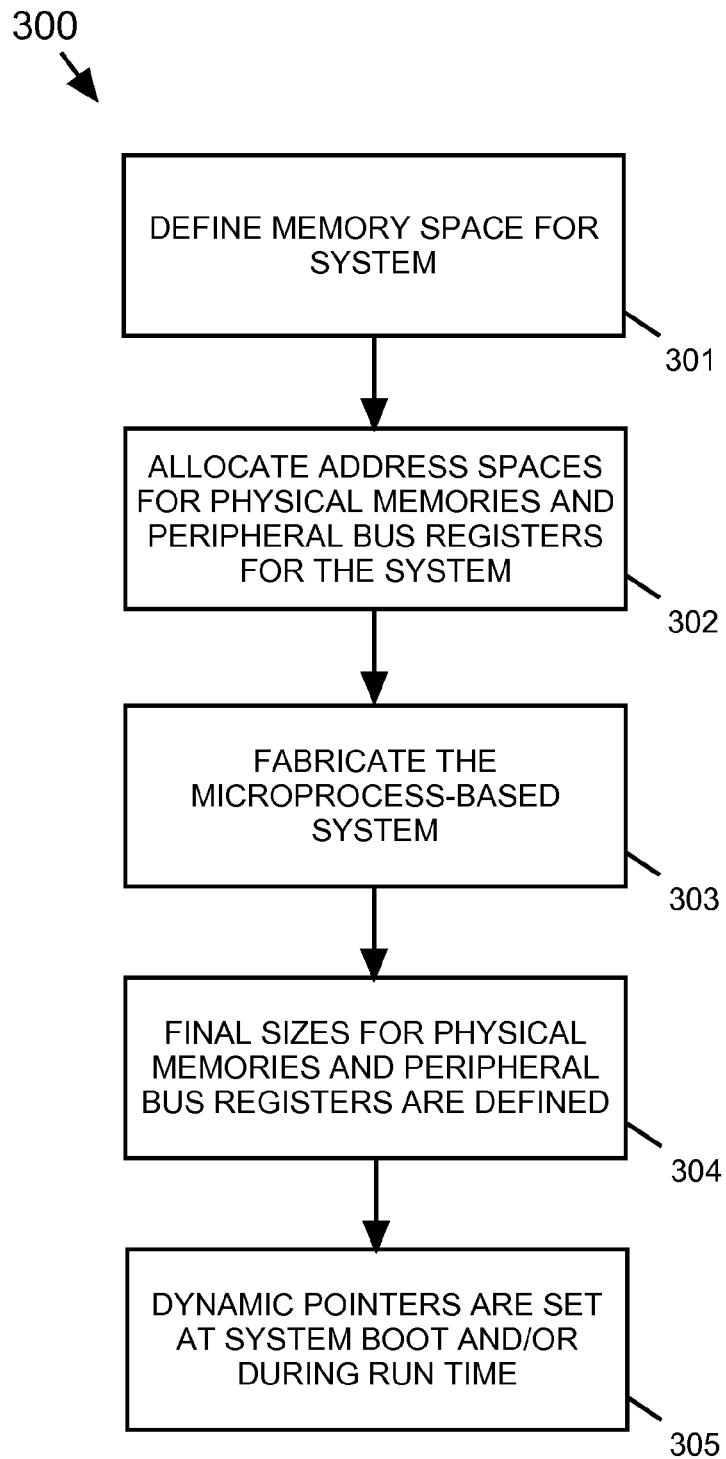
FIG. 3 depicts a flow diagram for an exemplary embodiment of a technique for allocating memory space according to the subject matter disclosed herein.

FIG. 3 depicts a flow diagram for an exemplary embodiment of a technique 300 for allocating memory space according to the subject matter disclosed herein. In block 301, a memory address space is defined for a system, such as, a microprocessor-based ASIC. At block 302, address spaces for physical memories and peripheral bus registers that will be used within the address space of the system are allocated. According to the subject matter disclosed herein, the respective sizes of the physical memories may not be known because the design of the system is not sufficiently defined; consequently, the initially allocated address space can be selected the anticipated maximum sizes of the physical memories. Additionally, the allocated address spaces can overlap to any degree. At block 303, the system is fabricated and embodied as, for example, a microprocessor-based ASIC. In another exemplary embodiment, the system could be fabricated as a general-purpose computing circuit. At block 304, the final sizes of the physical memories are established. At block 305, one or more dynamic pointers are set by the system when the system boots and/or during run time, thereby defining address space boundaries between the actual physical memories of the system. It should be understood that the one or more dynamic pointers can be set and reset depending on system configuration and conditions.

Figure 4:
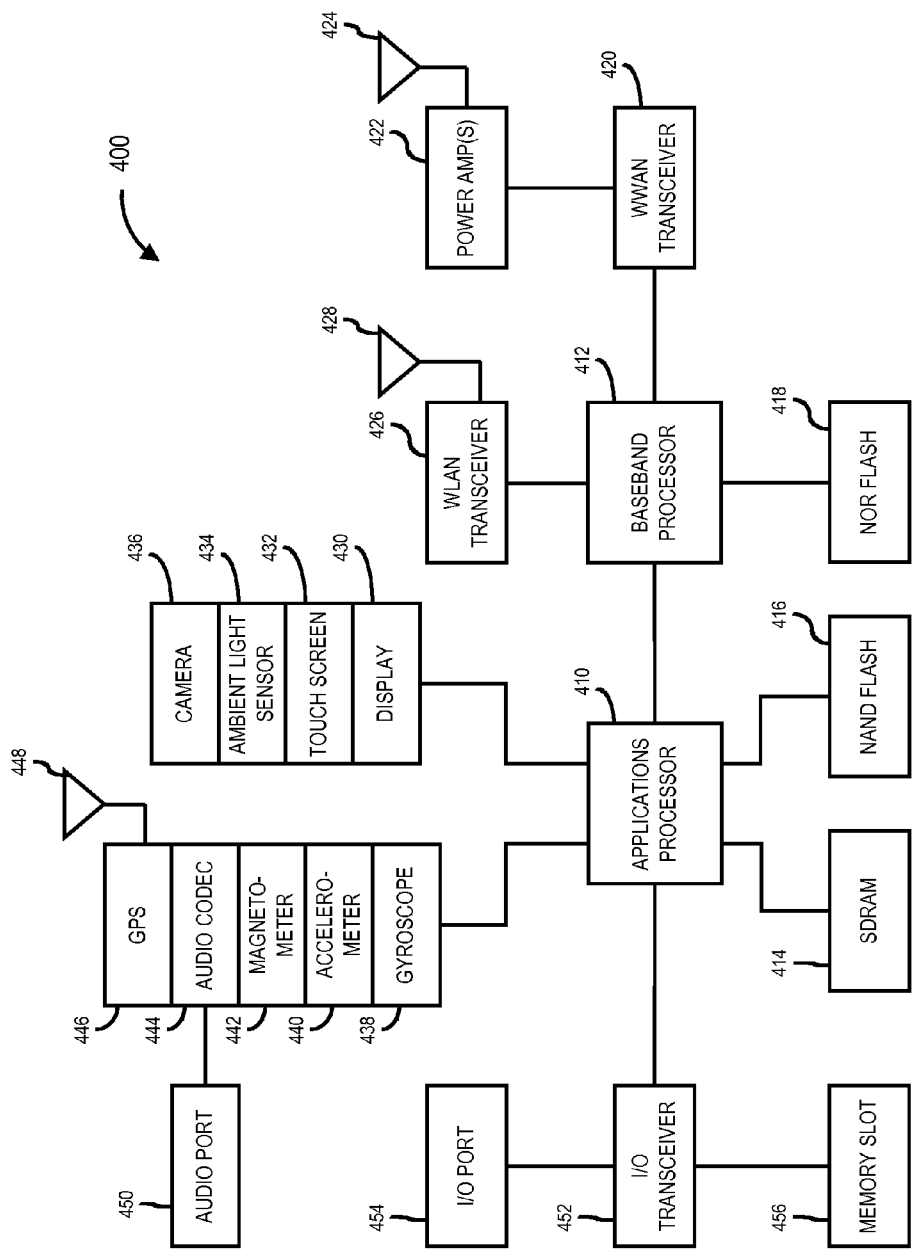
FIG. 4 depicts an exemplary functional block diagram of an information-handling system that is capable of tangibly embodying devices and/or circuitry that utilize memory space address allocation techniques as disclosed herein.

FIG. 4 depicts an exemplary functional block diagram of an information-handling system 400 that is capable of tangibly embodying devices and/or circuitry that utilize memory space address allocation techniques as disclosed herein. Although information-handling system 400 represents one example of several types of computing platforms, information-handling system 400 may include more or fewer elements and/or different arrangements of elements than shown in FIG. 4, and the scope of the claimed subject matter is not limited in these respects.

In one or more embodiments, information-handling system 400 may comprise one or more applications processor 410 and a baseband processor 412. Applications processor 410 may be utilized as a general purpose processor to run applications and the various subsystems for information-handling system 400, and to utilized memory address space allocation techniques as disclosed herein. Applications processor 410 may include a single core or alternatively may include multiple processing cores wherein one or more of the cores may comprise a digital signal processor or digital signal processing core. Additionally, applications processor 410 may include a graphics processor or coprocessor disposed on the same chip, or alternatively a graphics processor coupled to applications processor 410 may comprise a separate, discrete graphics chip. Applications processor 410 may include onboard memory, such as cache memory, and further may be coupled to external memory devices such as synchronous dynamic random access memory (SDRAM) 414 for storing and/or executing applications, such as capable of dynamically selecting memory boundaries according to the subject matter disclosed herein. During operation, NAND flash 416 is capable of storing applications and/or data even when information-handling system 400 is powered off. Further, applications processor 410 may execute computer-readable instructions stored in SDRAM 414 and/or NAND flash 416 that result dynamically allocating memory address space according to the subject matter disclosed herein.

In one exemplary embodiment, baseband processor 412 may control the broadband radio functions for information-handling system 400. Baseband processor 412 may store code for controlling such broadband radio functions in a NOR flash 418. Baseband processor 412 controls a wireless wide area network (WWAN) transceiver 420 which is used for modulating and/or demodulating broadband network signals, for example, for communicating via a 3GPP LTE network or the like as discussed herein with respect to FIG. 4. The WWAN transceiver 420 couples to one or more power amplifiers 422 that are respectively coupled to one or more antennas 424 for sending and receiving radio-frequency signals via the WWAN broadband network. The baseband processor 412 also may control a wireless local area network (WLAN) transceiver 426 coupled to one or more suitable antennas 428 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 410 and baseband processor 412, and the scope of the claimed subject matter is not limited in these respects. For example, any one or more of SDRAM 414, NAND flash 416 and/or NOR flash 418 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 410 may drive a display 430 for displaying various information or data, and may further receive touch input from a user via a touch screen 432, for example, via a finger or a stylus. In one exemplary embodiment, screen 432 display a menu and/or options to a user that are selectable via a finger and/or a stylus for entering information into information-handling system 400.

An ambient light sensor 434 may be utilized to detect an amount of ambient light in which information-handling system 400 is operating, for example, to control a brightness or contrast value for display 430 as a function of the intensity of ambient light detected by ambient light sensor 434. One or more cameras 436 may be utilized to capture images that are processed by applications processor 410 and/or at least temporarily stored in NAND flash 416. Furthermore, applications processor may be coupled to a gyroscope 438, accelerometer 440, magnetometer 442, audio coder/decoder (CODEC) 444, and/or global positioning system (GPS) controller 446 coupled to an appropriate GPS antenna 448, for detection of various environmental properties including location, movement, and/or orientation of information-handling system 400. Alternatively, controller 446 may comprise a Global Navigation Satellite System (GNSS) controller. Audio CODEC 944 may be coupled to one or more audio ports 450 to provide microphone input and speaker outputs either via internal devices and/or via external devices coupled to information-handling system via audio ports 450, for example, via a headphone and microphone jack.

Applications processor 410 may couple to one or more input/output (I/O) transceivers 452 to couple to one or more I/O ports 454 such as a universal serial bus (USB) port, a high-definition multimedia interface (HDMI) port, a serial port, and so on. Furthermore, one or more of the I/O transceivers 452 may couple to one or more memory slots 456 for optional removable memory, such as secure digital (SD) card or a subscriber identity module (SIM) card, although the scope of the claimed subject matter is not limited in these respects.

Figure 5:
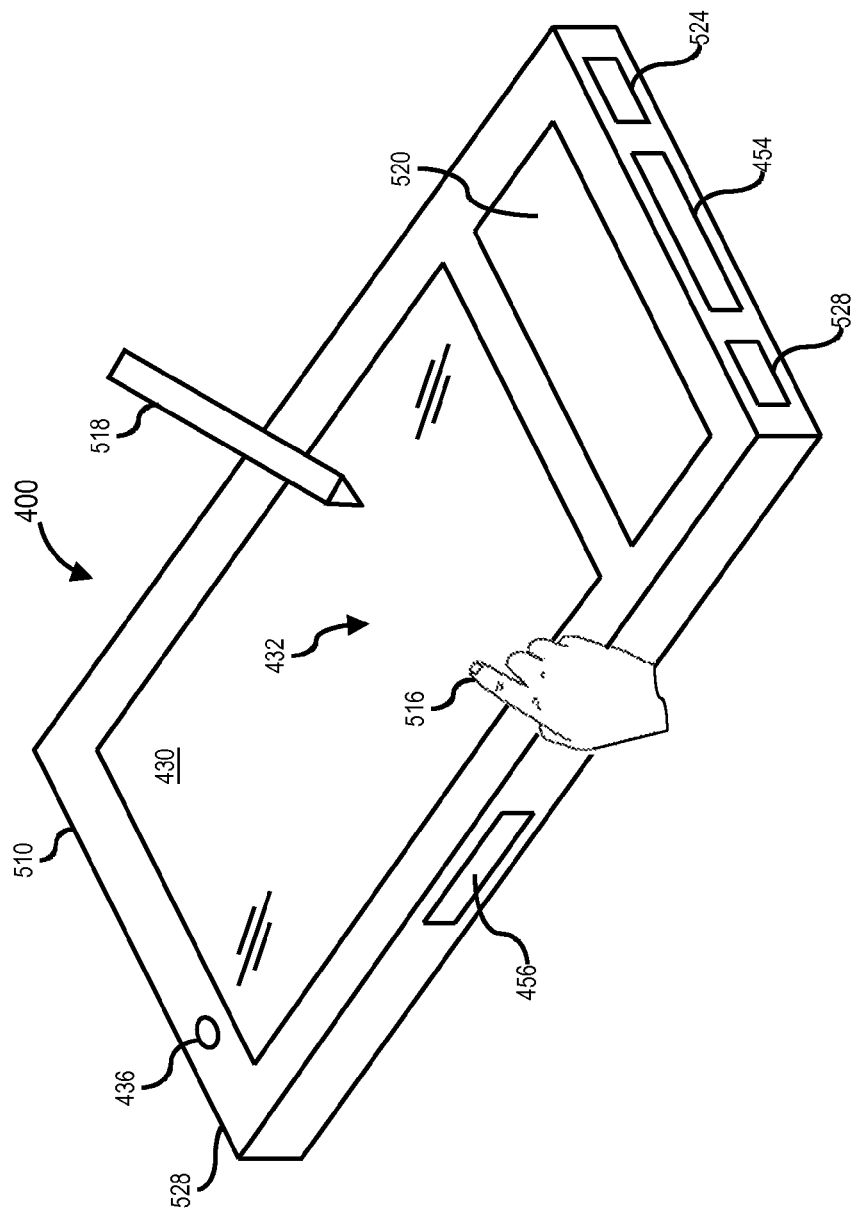
FIG. 5 depicts an isometric view of an exemplary embodiment of the information-handling system of FIG. 4 that optionally may include a touch screen in accordance with one or more embodiments disclosed herein.

FIG. 5 depicts an isometric view of an exemplary embodiment of the information-handling system of FIG. 4 that optionally may include a touch screen in accordance with one or more embodiments disclosed herein. FIG. 5 shows an example implementation of information-handling system 400 of FIG. 4 tangibly embodied as a cellular telephone, smartphone, smart-type device, or tablet-type device or the like, that is capable of utilizing memory space address allocation techniques as disclosed herein. Information-handling system 400 may comprise a housing 510 having a display 430 that may include a touch screen 432 for receiving tactile input control and commands via a finger 516 of a user and/or a via stylus 518 to control one or more applications processors 410. Housing 510 may house one or more components of information-handling system 400, for example, one or more applications processors 410, one or more of SDRAM 414, NAND flash 416, NOR flash 418, baseband processor 412, and/or WWAN transceiver 420. Information-handling system 400 further may optionally include a physical actuator area 520 which may comprise a keyboard or buttons for controlling information-handling system 400 via one or more buttons or switches. Information-handling system 400 may also include a memory port or slot 456 for receiving non-volatile memory, such as flash memory, for example, in the form of a secure digital (SD) card or a subscriber identity module (SIM) card. Optionally, information-handling system 400 may further include one or more speakers and/or microphones 424 and a connection port 454 for connecting information-handling system 400 to another electronic device, dock, display, battery charger, and so on. Additionally, information-handling system 400 may include a headphone or speaker jack 528 and one or more cameras 436 on one or more sides of housing 510. It should be noted that information-handling system 400 of FIGS. 4 and 5 may include more or fewer elements than shown, in various arrangements, and the scope of the claimed subject matter is not limited in this respect.

Figure 6:
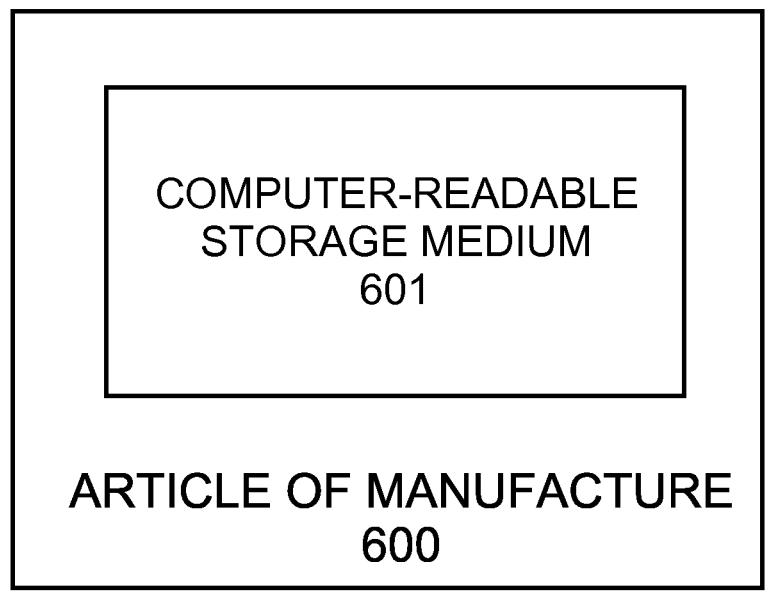
FIG. 6 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

FIG. 6 depicts an exemplary embodiment of an article of manufacture 600 comprising a non-transitory computer-readable storage medium 601 having stored thereon computer-readable instructions that, when executed by a computer-type device, results in any of the various techniques and methods according to the subject matter disclosed herein. Exemplary computer-readable storage mediums that could be used for computer-readable storage medium 601 could be, but are not limited to, a semiconductor-based memory, an optically based memory, a magnetic-based memory, or a combination thereof.

Although the foregoing disclosed subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. A method, comprising:
allocating a memory address space for each of a plurality of physical memories in a microprocessor-based system, a size of at least one of the plurality of physical memories being unknown at a time the memory address space for the at least one of the plurality of physical memories is allocated and at least two of the allocated memory address spaces overlapping at least a portion of each other, in which the overlapping portion comprises a difference between an anticipated maximum size of one of the at least two overlapping allocated memory address spaces and an anticipated maximum size of another of the at least two overlapping allocated memory address spaces;
fabricating the system after the allocating; and then
setting a pointer value corresponding to an address boundary between at least two of the plurality of physical memories of the fabricated system, the size of the at least one of the plurality of physical memories being known at a time the pointer is set.

2. The method according to claim 1, wherein setting the pointer comprises setting the pointer at a boot time of the system based on the size of the at least one physical memory being known at a time the pointer is set.

3. The method according to claim 2, wherein setting the pointer further comprises setting the pointer during a run time of the system after the boot time of the system.

4. The method according to claim 1, wherein setting the pointer comprises setting the pointer during a run time of the system after a boot time of the system.

5. The method according to claim 1, wherein the plurality of physical memories comprises at least one Read Only Memory (ROM) and at least one Random Access Memory (RAM).

6. The method according to claim 1, wherein the plurality of physical memories comprises at least one Read Only Memory (ROM) and a plurality of Random Access Memories (RAMs),
the method further comprising setting a second pointer corresponding to a RAM of the plurality of RAMs selected to be active.

7. The method according to claim 1, wherein the system comprising a microprocessor-based Application Specific Integrated Circuit (ASIC).

8. The method according to claim 7, wherein the ASIC is part of an information-handling system.

9. The method according to claim 8, wherein the information-handling system comprises a touch-screen display.

10. The method according to claim 8, wherein the information-handling system comprises a wireless link interface.

11. The method of claim 1, wherein the pointer value further corresponds to an address within the overlapping portion.

12. A method, comprising:
defining a memory space for a system;
allocating a memory address space for each of a plurality of physical memories in the system, a size of at least one of the plurality of physical memories being unknown at a time the memory address space for the at least one of the plurality of physical memories is allocated and at least two of the allocated memory address spaces overlapping at least a portion of each other, the overlapping portion comprising a difference between an anticipated maximum size of one of the at least two overlapping allocated memory address spaces and an anticipated maximum size of another of the at least two overlapping allocated memory address spaces;
fabricating the system after the allocating; and then
setting a pointer value corresponding to an address boundary between at least two of the plurality of physical memories of the fabricated system, the size of the at least one of the plurality of physical memories being known at a time the pointer is set.

13. The method according to claim 12, wherein setting the pointer comprises setting the pointer at a boot time of the system based on the size of the at least one physical memory being known at a time the pointer is set.

14. The method according to claim 13, wherein setting the pointer further comprises setting the pointer during a run time of the system after the boot time of the system.

15. The method according to claim 12, wherein setting the pointer comprises setting the pointer during a run time of the system after a boot time of the system.

16. The method according to claim 12, wherein the plurality of physical memories comprises at least one Read Only Memory (ROM) and at least one Random Access Memory (RAM).

17. The method according to claim 12, wherein the plurality of physical memories comprises at least one Read Only Memory (ROM) and a plurality of Random Access Memories (RAMs),
the method further comprising setting a second pointer corresponding to a RAM of the plurality of RAMs selected to be active.

18. The method according to claim 12, wherein the system comprising a microprocessor-based Application Specific Integrated Circuit (ASIC).

19. The method according to claim 18, wherein the ASIC is part of an information-handling system, the information-handling system comprising a touch-screen display.

20. The method of claim 12, wherein the pointer value further corresponds to an address within the overlapping portion.

* * * * *